Figure 1:
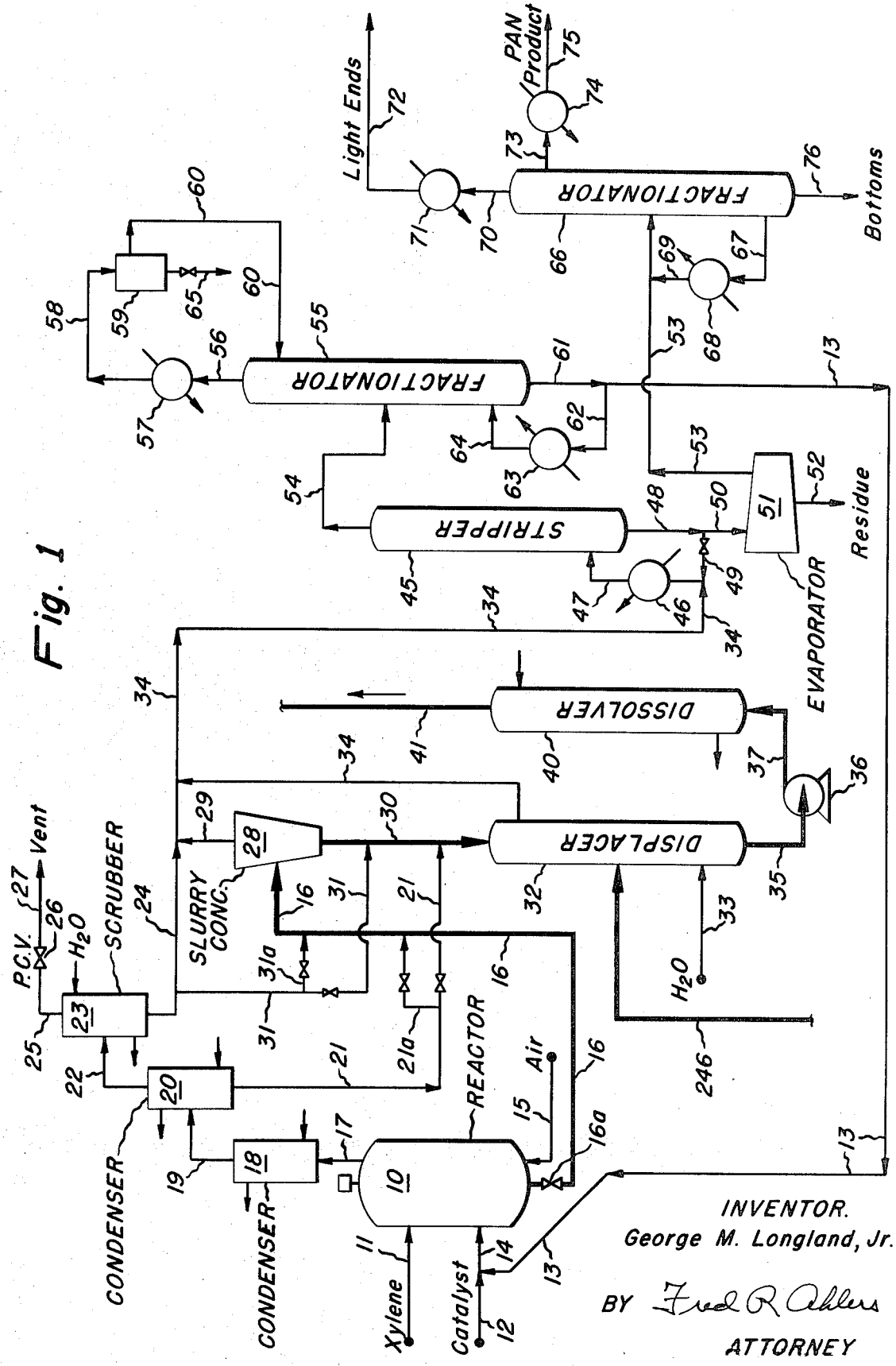

United States Patent
Longland, Jr.

[15] 3,683,018

[45] Aug. 8, 1972

[54] INTEGRATED OXIDATION OF ISOMERIC XYLENE MIXTURE TO ISOMERIC PHTHALIC ACID MIXTURE AND SEPARATION OF MIXTURE OF ISOMERIC PHTHALIC ACIDS INTO INDIVIDUAL ISOMER PRODUCTS

[72] Inventor: George M. Longland, Jr., Highland, Ind.

[73] Assignee: Standard Oil Company, Chicago, Ill.

[22] Filed: May 26, 1969

[21] Appl. No.: 827,732

[52] U.S. Cl............260/524 R, 23/270 R, 23/273 R, 23/284, 260/525
[51] Int. Cl. ....C07c 51/42, C07c 51/44, C07c 63/02
[58] Field of Search...........................260/524 R, 525

[56] References Cited

UNITED STATES PATENTS

| | | | |
|---|---|---|---|
| 2,853,514 | 9/1958 | Brill | 260/524 |
| 3,029,278 | 4/1962 | Spiller et al. | 260/525 |
| 3,244,744 | 4/1966 | Bowman | 260/525 |
| 3,072,717 | 1/1963 | Pritchett et al. | 260/524 |
| 3,240,803 | 3/1966 | Thompson et al. | 260/524 |

OTHER PUBLICATIONS

Tipson, " Crystallization and Recrystallization" in Technique of Organic Chemistry, Vol. III, Weissberger, ed., 1950, pages 410– 411.

*Primary Examiner*—Lorraine A. Weinberger
*Assistant Examiner*—R. S. Weissberg
*Attorney*—Arthur G. Gilkes, William T. McClain and Fred R. Ahlers

[57] ABSTRACT

Liquid phase oxidation of isomeric xylene mixture with molecular oxygen-containing gas (e.g. air or oxygen gas) in the presence of aqueous or acetic acid reaction media and catalysis provided by one or more heavy metals (metals of about 50 to about 200 atomic weight) or by a side-chain oxidation initiator or promotor (bromine source, or acetaldehyde or methylenic ketone) provides oxidation effluent containing mixture of isomeric phthalic acids for product crystallization and reaction media displacement from concentrate of said effluent by contact of the concentrate with water in a single step, preferably conducted with a vertical column of water, thereby producing aqueous acetic acid for feed to acetic acid recovery and recycle to oxidation and aqueous slurry of mixture of isomeric phthalic acids as feed for separation into individual phthalic acid isomer products. Iso- and terephthalic acids in particular are separated from mixtures of the same by crystal size classification.

7 Claims, 2 Drawing Figures

INVENTOR.
George M. Longland, Jr.
BY Fred R Ahlers
ATTORNEY

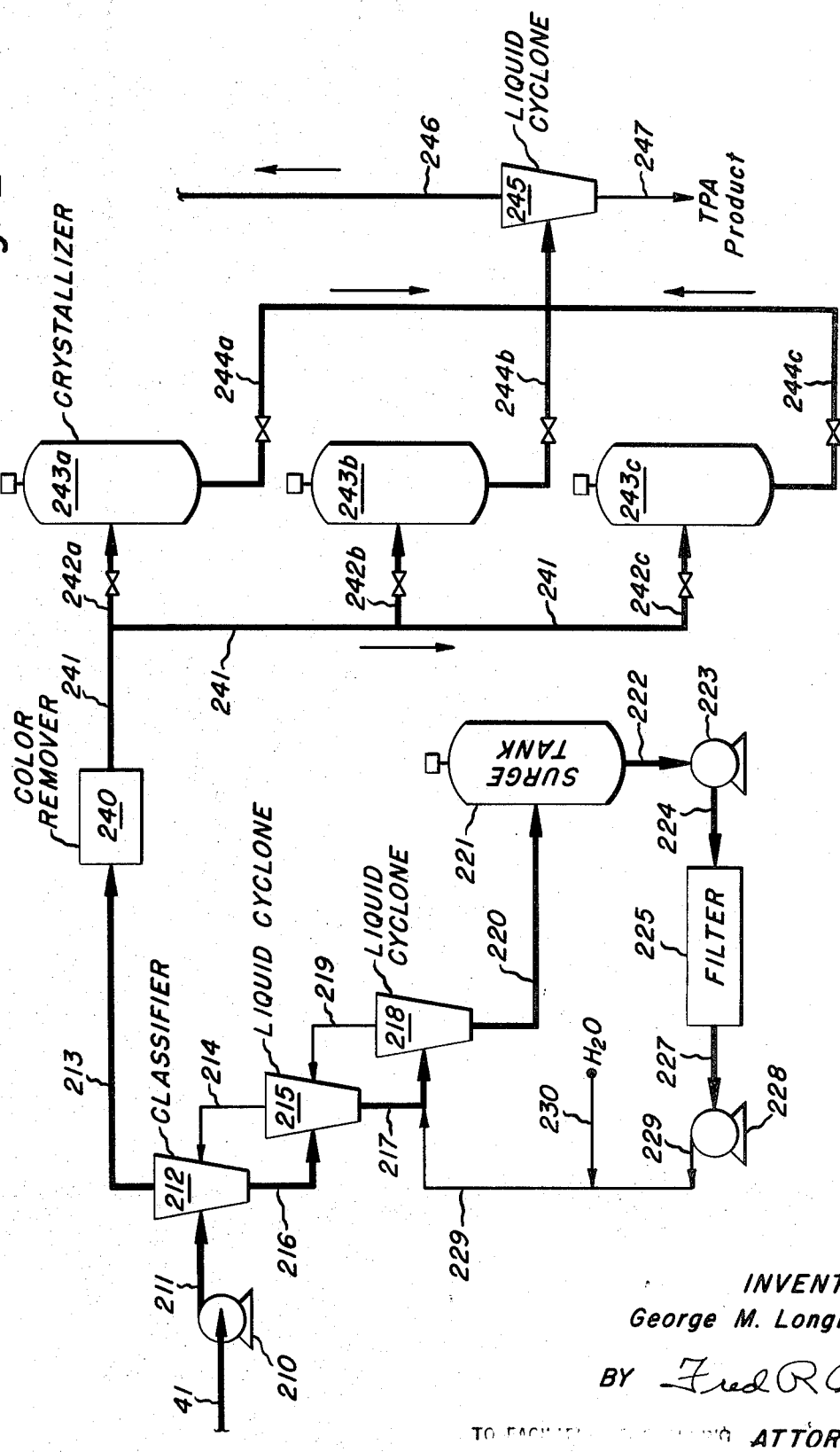

3,683,018

INTEGRATED OXIDATION OF ISOMERIC XYLENE MIXTURE TO ISOMERIC PHTHALIC ACID MIXTURE AND SEPARATION OF MIXTURE OF ISOMERIC PHTHALIC ACIDS INTO INDIVIDUAL ISOMER PRODUCTS

BACKGROUND OF THE INVENTION

Catalytic liquid phase oxidations of isomeric xylene mixtures can be conducted with gas-containing molecular oxygen, (e.g. air or oxygen gas) in the presence of aqueous or acetic acid reaction media under pressure to maintain a liquid phase of the reaction media at temperatures of from 50° up to 275° C. Such oxidations, for example as described in U.S. Pat. No. 2,833,816, produce fluid reaction effluents containing mixtures of isomeric phthalic acids both as solute and as crystalline precipitate. In general, the oxidation effluent is subjected to two separate crystallization steps to recover a first mixed product containing substantially all of the iso- and tere-phthalic acids and either only about 25 percent or up to 75–80 percent of o-phthalic acid and by a second crystallization practiced with the first mother liquor or a concentrate thereof recover a second crystalline product which is mainly o-phthalic acid. In the first crystallization the amount of o-phthalic acid precipitated depends upon the temperature at which crystallization is effected. The ortho isomer is the most soluble of the three isomeric phthalic acids and thus lower crystallization temperatures are required to precipitate 75 percent of the ortho isomer than are required to precipitate only 25 percent with the other two phthalic acid isomers.

The recovered first acid precipitate comprises a mixture of the three phthalic acid isomers. Since the only practical use of such a mixture is the isomerization of the potassium salts of the mixture at elevated temperature and pressure in a carbon dioxide atmosphere to mainly dipotassium terephthalate, it is desirable to separate the recovered mixture of isomeric phthalic acids into individual phthalic acid isomer products. The mixture of isomeric phthalic acid isomers can be extracted at moderate temperatures, e.g. below 150° C., with such solvents as water or acetic acid to selectively dissolve sparingly soluble (sparingly soluble at temperatures in the range of 100° to 150° C.) iso- and tere-phthalic acids as a solid residue. The ortho isomer solute in the extracted solution is recovered by crystallization or by distillation first of the solvent and then of phthalic anhydride. The extraction residue is a mixture of iso-and tere-phthalic acids that can only be separated by ordinary fractional crystallization into a terephthalic acid product and an isophthalic acid product which is contaminated by one weight part terephthalic acid for each 5.6 to 9 weight parts of isophthalic acid in the original extraction residue depending upon the solvent used. Such a mixture of isophthalic and terephthalic acids has become known (U.S. Pat. No. 3,029,278) as a constant solute ratio mixture which is not separable by ordinary fractional crystallization techniques but rather is separable only by the use of unused means such as through the fractional crystallization of aqueous solution of pyridine salts of such mixture or by a combination of selective nucleation-crystallization and crystal size classification. These unusual separations are known, for example from U.S. Pat. No. 3,059,025 (use of pyridine salts), No. 3,029,278 and No. 3,244,744, the latter two make use of unique crystal size or density differences as bases for effective separation of the constant solute ratio mixture of iso- and tere-phthalic acids.

There are many drawbacks associated with combining said oxidations of mixtures of isomeric xylenes and separating the resulting mixtures of isomeric phthalic acids. The main drawbacks are the separate crystallization treatment of the oxidation effluent to obtain the mixture of isomeric phthalic acids, separate recovery of the mixed isomer magma from the oxidation mother liquor media, separate extraction of the magma to recover the extract solution of ortho acid isomer from residue undissolved tere- and iso-phthalic acid mixture and then effecting resolution of that mixture. The present inventive integrated process eliminates those individual steps between oxidation and subsequent unique separations of mixtures of tere- and iso-phthalic acids.

SUMMARY OF THE INVENTION

The present inventive integrated process in its broadest concept comprises the procedural steps of:

a. catalytic liquid phase air oxidation in an oxidation zone of a mixed xylene comprising at least m-xylene and one or more of o- and p-xylene in the presence of acetic acid in the weight ratio to xylene in the range of 1.0–5.0:1.0 at a temperature in the range of 100°–250° C. in the presence of a heavy metal oxidation catalyst and preferably an alkyl chain oxidation initiator or promotor such as acetaldehyde, a methyl ketone or bromine providing material or mixtures thereof;

b. removing liquid oxidation effluent from the oxidation zone;

c. contacting under liquid phase conditions said liquid oxidation effluent with water in a displacement zone into the bottom of which liquid water is introduced countercurrent to said liquid oxidation effluent and removing from said displacement zone a liquid phase of acetic acid mother liquor solution of o-phthalic acid as an overflow stream and an aqueous slurry of isophthalic acid or a mixture of iso- and terephthalic acids as a bottoms stream;

d. distilling said overflow stream to remove acetic acid and water as a first fraction and crude phthalic anhydride as a second fraction and leaving as a liquid viscous residue materials boiling higher than said anhydride;

e. heating said aqueous slurry to a temperature from 10 to 50° C. above the temperature at which the water is substantially saturated with respect to isophthalic acid;

f. separating the solution from undissolved terephthalic acid when it is present in an amount above its concentration in the constant ratio solute composition of iso- and tere-phthalic acid;

g. cooling said solution of constant ratio solute composition until visual nucleation is established and thereafter rapidly cooling whereby rapid crystal growth and precipitation of the bulk of the solute as a crystalline magma occurs;

h. separating the crystalline magma from the aqueous mother liquor; and i. recovering an isophthalic acid product and a terephthalic acid product from said crystalline magma precipitate by a differential density separation.

When the mixture of xylenes oxidized contains substantially only o- and m-xylenes, the foregoing process can be simplified. The bottoms slurry stream from the displacement zone can be separated to obtain an isophthalic acid product when terephthalic acid is present in amounts downward from its content in the constant ratio solute composition. But when the solid in said bottoms slurry contains 2 to 10 percent terephthalic acid and high purity isophthalic acid is desired then the slurry is heated to dissolve such solid, the solution is cooled slowly to the first visual nucleation and rapidly to crystal growth and precipitation of mixture of crystals which are separated on density difference basis.

When the mixture of xylenes oxidized contains only m- and p-xylene, the overflow acetic acid mother liquor is distilled to recover acetic acid, e.g. azeotropic distillation to easily separate mainly water as overhead fraction and mainly acetic acid as an intermediate fraction or reboiler vapor. The bottoms aqueous slurry is processed as above described.

The present inventive process can be conducted continuously throughout when the oxidation is preferably conducted continuously at 175°–250° C. and pressures of 300–500 p.s.i.g. with catalysis provided by one or more heavy metals, for example cobalt, manganese and cerium, or mixtures of two or all three of those metals in combination with a source of bromine. Preferably such catalysis is provided by 0.2 to 1.0 percent total metals and 0.2 to 1.0 percent bromine concentrations in acetic acid which is used in weight ratios of 2–5:1.0 based on xylene feed. Continuous withdrawal of the liquid oxidation effluent provides a continuous source of feed to the displacement zone from which the acetic acid mother liquor portion of the liquid oxidation effluent can be withdrawn continuously as feed for continuous concentration by fractionation, preferably continuous azeotropic fractionations using an aromatic hydrocarbon such as benzene or a xylene to aid in the removal of water. Continuous withdrawal of bottoms aqueous slurry provides feed for continuous separation of terephthalic acid product and/or isophthalic acid product.

The displacement zone is operated under conditions of pressure which maintain acetic acid and water in the liquid phase. The liquid oxidation effluent enters near the top of a column of water maintained in that zone. Said column of water can be static or can have a net upward flow by introducing water into the bottom of the displacement zone in an amount exceeding that required for the formation of the aqueous slurry of isophthalic containing crystalline mass. Suitably said slurry contains upward from five, desirably at least 10 and preferably 20 to 40 parts of isophthalic acid per 100 parts of water on a weight basis. The net upflow of said column of water can be, based on acetic acid introduced by the liquid oxidation effluent of from 0 to 50 percent. It is preferred that the displacement zone column of water comprise 70–85 percent of the height of a vertical tubular chamber. This permits the isophthalic acid containing crystalline product to drop downward through the column of water which washes adhering acetic acid mother liquor from the falling crude crystalline product.

The liquid oxidation effluent can be introduced into the displacement zone at or near the top of the column of water therein at the temperature of 175°–250° C. at which the effluent is produced or said effluent can be cooled to a lower temperature, for example, by dilution with condensate from the oxidation exhaust gas. The diluted liquid oxidation effluent can be concentrated, when no o-xylene has been oxidized, for example by centrifugal force provided by the use of a liquid hydroclone into which the diluted liquid oxidation effluent is charged tangentially and from which acetic acid mother liquor is removed as an overflow stream and from which concentrated liquid oxidation effluent flows as an underflow stream directly into the upper part of the vertical tubular chamber containing the displacement zone column of water. Terephthalic acid and isophthalic acid have low solubilities in water at temperatures below about 180° C. The water column comprising the displacing medium in the displacement zone can be at a temperature in the range of suitably 10° to 180° C., desirably 25° to 150° C. and preferably 50° to 150° C. The withdrawn bottoms slurry of crystalline mass containing isophthalic acid is then heated to a temperature 10° to 20° C. above the temperature required to dissolve the isophthalic acid as a saturated solution thereof. The temperature of forming a saturated solution of constant ratio solute composition (about 90 percent isophthalic acid and 10 percent terephthalic acid) is about the same as for isophthalic acid alone.

The solubility of ortho-phthalic acid in acetic acid (0–3.0 percent water) is about 100 times the solubility of isophthalic acid which in turn is about 10 times the solubility of terephthalic acid. When commercial xylene (10–25 percent p-xylene, 30–55 percent m-xylene, 15–30 percent o-xylene and 5 to 35 percent ethylbenzene) is oxidized a mixture of tere-, iso- and o-phthalic acids with benzoic acid (product of ethylbenzene oxidation) is in the liquid oxidation effluent. Substantially all of the o-phthalic acid and benzoic acid can be retained as solutes in the acetic acid mother liquor at a temperature as low as 60°–75° C. These solubility differences can be used to advantage as will hereafter be demonstrated.

THE DRAWINGS

The integrated process of this invention can be illustrated by way of schematic process flow-sheet drawings which are a part hereof.

FIG. 1 is a schematic flow sheet drawing illustrating the liquid phase air oxidation of xylene feed conducted in reactor 10 from which liquid oxidation effluent is withdrawn via transfer conduit 16 through concentrator 28 to displacer 32 for contact with the column of water therein. Overflow displaced acetic acid mother liquor from displacer 32 flows via line 34 to stripper 45 which strips out water and acetic by simple distillation as feed, preferably vapor feed, for azeotropic fractionation tower 52. Bottoms fraction from stripper 45 is evaporated to complete conversion of o-phthalic acid to its anhydride and vaporize it as feed to fractionator 65 for recovery of a phthalic anhydride produce (PAN).

Bottom slurry from displacer 32 is pumped to dissolver 40 where the slurry is heated and converted into an aqueous solution drawn off as overflow via solution transfer conduit 41 for recovery of terephthalic acid (TPA) and isophthalic acid (IPA) as shown in FIG. 2.

FIG. 2 is a schematic flow-sheet drawing illustrating one technique for TPA and IPA recovery according to the present inventive integrated process. The aqueous solution of IPA and TPA from dissolver 40 (FIG. 1) and solution transfer conduit 41 is pumped as feed tangentially into hydroclone classifier 212 whose overflow stream is a solution of constant ratio solute IPA-TPA composition.

For convenience of following processing of liquid oxidation effluent by the present inventive integrated process through the steps of recovery of phthalic acid products, those flow streams containing one or more phthalic acid for processing are shown in FIGS. 1 and 2 in extra heavy weight lines.

The cooperating integrated steps and equivalents therefor comprising the present integrated inventive process will be more clearly understood from the following illustrations of complete processes directed to specific embodiments described with particular reference to the accompanying drawings.

EXAMPLE 1

With reference to FIG. 1:

a. Continuous oxidation at a temperature of 225°–230° C. and a pressure of 28.2 atmospheres with continuous and simultaneous introduction into the stirred liquid phase in reactor 10 on an hourly basis of 1.0 pound mole of a mixture of xylenes consisting 75 percent m-xylene and 25 percent p-xylene by weight and 265 pounds of 97 percent acetic acid (3 percent water) containing 0.12 percent total metals (e.g., Co, Mn and Ce) and 0.10 percent bromine (as bromide). The xylene is introduced through charge line 11 and the acetic acid solution of catalyst components is introduced through charge lines 12 and 14. Most of the acetic acid is recycled via line 13, from liquid oxidation effluent processing later described. Pressurized air via gas line 15 to supply molecular oxygen oxidant is introduced through the bottom of reactor 10 at the rate of 50 to 70 standard cubic feet per pound of xylene which provides an excess of oxygen over the stoichiometric requirement to convert the xylenes to phthalic acids. The excess oxygen appears in reactor 10 exhaust gas with vapors of acetic acid and water in admixture with nitrogen and oxides of carbon and amounts to 1–3 percent oxygen by volume on an acetic acid free exhaust gas basis. Said exhaust gas leaves reactor 10 via line 17 and enters reflux condenser 18 operated to condense acetic acid and return the condensate via line 17 to reactor 10 thereby through acetic acid boil-up by heat of reaction and acetic acid condensation heat of reaction is in part removed. The remainder of the heat of reaction is taken up by heating introduced feed xylene, acetic acid solution and pressurized air to reaction temperature. Uncondensed acetic acid and water vapors pass from condenser 18 via line 19 to condenser 20 where most of the remaining water and acetic acid vapors are condensed. Uncondensibles leave condenser 20 via line 22 and are contacted with water spray in scrubber 23 and the scrubber gas flows through line 25 and pressure control valve 26 set at 28.2 atmospheres to atmospheric vent 27. Aqueous scrubber liquors containing acetic acid, for the most part, are processed to recover 97 percent acetic acid for recycle to reactor 10 and leave scrubber 23 via line 24. Liquid oxidation effluent leaves reactor 10 through valved slurry transfer 16 whose valve 16a is closed only during start up or shutdown of reactor 10.

Liquid oxidation effluent in slurry transfer 16, in addition to the acetic acid solution of catalyst components, contains on an hourly basis 156 pounds (117 pounds IPA and 39 pounds TPA) phthalic acids.

b. Liquid oxidation effluent in slurry transfer 16 at 225°–230° C. and 28.2 atmospheres enters tangentially as feed for concentrator 28 (shown as a liquid cyclone) from which about 50 percent of the acetic acid (now containing about 14.5 percent water) is removed as overflow via line 29 for recovery of acetic acid (97 percent) for recycle. Underflow from concentrator 28, comprising concentrated liquid oxidation effluent, is diluted with condensate from condenser 20 and valved condensate transfer line 21 and a portion of scrubber liquor taken from line 24 via valved line 31. This condensate and scrubber liquor portion can be added to liquid oxidation effluent in slurry transfer 16 before it discharges in to concentrator 28, for example via valved conduits 21a and 31a. But in this case the condensate in valved line 21 and scrubber liquor portion in valved line 31 are added as quench to liquid oxidation effluent in underflow conduit 30 which discharges into the top of displacer vessel 32. Said quenching liquids are at about 40° C. and effect cooling of said effluent concentrate.

c. Displacer vessel (shown as a vertical tubular tower) is filled to about 85 percent of its volume with water introduced therein at about 40°–45° C. through water charge line 33 at a rate to provide a net upflow of 20 pounds of water per hour and 390 pounds water per hour to remove IPA-TPA slurry. The acetic acid (14.5 percent water) from concentrated liquid oxidation effluent and 20 pounds net upflow of water leave displacer 32 via overflow line 34 and is joined with concentrator 28 overflow from line 29 and the remainder of scrubber liquor from line 24 is processed for recovery of 97 percent acetic acid for recycle to reactor 10. There flows on an hourly basis from the bottom of displacer 32 a slurry of 156 pounds (117 pounds IPA and 39 pounds TPA) in 390 pounds water via aqueous slurry transfer line 35 as feed to slurry pump 36 which discharges the slurry via aqueous slurry transfer 37 to dissolver 40. The slurry entering dissolver 40 flows upward and is heated to 210° C. and a pressure of 20 atmospheres to dissolve all IPA and 13 pounds per hour of TPA in liquid water and leave 26 pounds TPA per hour undissolved. The solution of IPA and undissolved TPA leaves dissolver 40 via overflow transfer line 41 which carries the solution to IPA and TPA recovery shown in FIG. 2.

There remains in FIG. 1 for this example the recovery of 97 percent acetic acid for recycle to reactor 10. This is accomplished by using combined scrubber liquor from line 24, concentrator overflow from line 29 and displaced acetic acid from displacer 32 all flowing in line 34 as feed for stripper 45. Said stripper feed is mixed with a portion of stripper bottoms from valved conduit 49 and is preheated by heater 46 to vaporize water and acetic acid. The vapors flow via vapor feed line 47 into stripper 45 (e.g. a simple distillation tower) where acetic acid and water is separated from high boilers (metal compounds). The vapors of acetic acid and water leave the top of stripper 45 via vapor transfer 54 as feed for azeotropic fractionator 55 into the upper portion of which is added benzene or xylene. Azeotropic fractionator 55 has reboiler system comprising bottoms transfer 62, boiler 63 and bottoms vapor transfer 64. The bottoms product from azeotropic fractionator 55 is 97 percent acetic acid (3 percent water) and is discharged via line 61 to acetic acid recycle line 13 as feed to reactor 10. A benzene (or o-xylene) water vapor mixture leaves the top of azeotropic fractionator 55 via azeotropic vapor line 56, flows through cooler 57 and condensate line 58 to separator 59 where the top benzene (or o-xylene) liquid is drawn off and recycled via line 60 to azeotropic fractionator 55 and the lower water layer is discarded by valved conduit 65.

When the xylene feed to reactor 10 also contains o-xylene the resulting o-phthalic acid can be retained dissolved in acetic acid from concentrator 28 overflow 29 and displacer 40 overflow 34 and appears as phthalic anhydride (PAN) in stripper bottoms discharge 48. This PAN containing stripper bottoms is charged via line 50 to evaporator 51 to vaporize PAN whose vapors leave via PAN vapor line 53 (metal catalyst containing materials-generally phthalates are discharged by line 52 as a viscous residue). PAN vapor via line 53 is charged to fractionator 66 from which light ends are withdrawn via vapor line 70, cooler 71 and light ends condensate line 72. PAN product, generally requiring further processing to be useful in manufacture of water white plasticizer esters or light colored saturated or unsaturated resins, is taken as heart cut fraction via line 73, cooler 74 and PAN product line 75. Bottoms from fractionator 66 are discarded through discharge line 76. Reboilers system for fractionator 66 is shown as line 67, boiler 68 and vapor line 69.

With respect to FIG. 2:

d. The solution of IPA (130 pounds constant ratio solute IPA-TPA composition) also containing undissolved TPA (26 pounds) in 390 pounds water on an hourly basis in overflow transfer line 41 (from FIG. 1) enters suction side of pump 210 and is discharged as tangential feed into classifier 212 shown as a liquid cyclone but could be a settling tank to accomplish the same classification, wherein the aqueous feed diluted with overflow in line 214 from liquid cyclone 215 is concentrated affording a new slurry of undissolved TPA as underflow in line 216 and an overflow in line 213 as substantially only an aqueous solution of said constant ratio IPA-TA composition. New TPA slurry in line 216 and overflow in line 219 from liquid cyclone 218 are tangential feeds to liquid cyclone 215 whose underflow in line 217 and recycle water from TPA recovery plus make up water constitute tangential feed to liquid cyclone 218. Underflow from liquid cyclone 218 leaves it via line 220 and is substantially only undissolved TPA slurried in water. Said underflow slurry from line 220 is discharged into stirred hold tank 221 from which the slurry of TPA in water is withdrawn by pump 223 via line 222 and discharged via line 224 into pressure solid-liquid separating device 225 which can be a filter, centrifuge, etc. capable of separating solids from liquids under pressure and discharging wet solids to atmospheric pressure. Wet TPA product is discharged therefrom via product discharge at an hourly rate of 29 pounds TPA on a dry basis.

Water from solid-liquid separator 225 is discharged via line 227 to the suction side of pump 228 whose discharge into line 229 provides recycle water diluted to feed for liquid cyclone 218. Make up water via line 230 in an amount equal to the water in wet TPA product discharged via line 226 is added to water recycle line 229.

The foregoing TPA product separation starts with (on an hourly basis) the slurry of 26 pounds of undissolved TPA in 520 pounds (390 pounds water) aqueous solution of 130 pounds constant ratio solute composition (117 pounds IPA and 13 pounds TPA) at 210° C. and 20 atmospheres. The solution in line 213 is at the same temperature and pressure and contains 390 pounds of water and 130 pounds constant ratio IPA-TPA solute composition. During the dilutions, concentrations and separations occurring in liquid cyclones 212, 215 and 218, the amount of aqueous carrier for undissolved 26 pounds TPA in minimum and can become that amount convenient for assured slurry flow. By the flow of water countercurrent to flow of undissolved TPA from solid-liquid separator 225 to liquid cyclone 218, to liquid cyclone 215 and then to liquid cyclone 212 substantially all of the aqueous solution carrier of undissolved TPA in underflow line 216 becomes displaced and appears in line 213, substantially none of that solution appears in surge tank 221 and the countercurrent flow of solution displacing water is, except for the make up water added, remains in balance. Also the entire system can be operated without change from 210° C. and 20 atmospheres, except for TPA discharge to atmospheric pressure, by introducing make up water via line 230 at 210° C. and 20 atmospheres. The amount of solution displacing water cycling through this TPA recovery system can be from about 1.0 up to 10.0 pounds per pound of TPA but usually will be more suitably in the range of 2.0 to 3.0 pounds of water per pound of TPA. However, the amount of that recycling water can be greater, e.g. 40 to 50 pounds per pound of TPA which will dissolve all the TPA at 210° C. In this case a solution of TPA in water is discharged into surge tank 221 and that solution can be cooled and depressurized through evaporative cooling (surface boil off of water in an auxiliary vessel (not shown) operated at a temperature of 100° to 150° C. and 1.0 to 4.75 atmospheres pressure with or without release of water vapor (released water vapor is condensed and recycled) and the resulting crystalline TPA separated at a lower pressure. Such operations require reheating and repressurizing recycled water.

e. The solution of constant ratio solute (IPA-TPA) composition in line 213 contains (on an hourly basis) 390 pounds of water, 117 pounds of IPA and 13 pounds TPA at 210° C. and 20 atmospheres. This solution is processed to recover an IPA product. An IPA product containing about 95-98 percent IPA and 5-2 percent TPA is useful for manufacture of polyester for fiber spinning, ester type (e.g. di-oxo-octyl) plasticizers and saturated and unsaturated ester molding resins providing the impurity content (color bodies and color formers) is suitably low. To obtain an IPA product suitable for such uses the solution in line 213 is treated to remove said impurities such as with activated carbon of low metals content or with a noble metal (platinum or palladium on high surface, low metal content carbon)

in color remover 240. Activated carbon will remove color bodies and some color formers and noble metal on carbon will remove substantially all impurities deleterious to polyester fiber manufacture. The solution after being treated in color remover 240 flows via line 241 to one or more crystallizers 243 such as 243a, 243b, 243c through valved conduits 242a, 242b and 242c. It is desirable to conduct the crystallization of IPA product batchwise in each of crystallizers 243 because cooling first slowly to the visual nucleation (cloud point of solution and then rapidly for crystal growth according to the process of U.S. Pat. No. 3,029,278 can be conveniently controlled and observed in a minimum of crystallizers on a batchwise basis of operation. Each crystallizer 243 is prepressurized to 20 atmospheres pressure and heated to 210° C. temperature with steam to avoid flash evaporation of introduced feed solution. The crystallizer is first charged to about 15–25 percent of its volume and evaporative cooling (boil up of water from solution surface) is started, e.g. by reducing the pressure and the water vapor generated can be withdrawn and condensed for reuse, for example as part of the water supply to displacer 32. When the cloud point of the cooling solution first charged is reached additional solution from line 213 is introduced below the liquid level of the first charged solution while continuing the evaporative cooling at the same reduced pressure and removal of water vapor until the crystallizer is filled first to the volume where solution entrainment by removed vaporized water does not occur. Then introduction of feed solution is stopped and rapid cooling to 100°–110° C. and 1.0–1.44 atmospheres by evaporative cooling and/or other cooling measures is accomplished. The crystalline magna produced contains large IPA product crystals and small TPA product crystals of different densities. Said small crystals of lower density than the large crystals can be separately recovered by density classification, for example, by the use of a liquid cyclone as shown. The slurry of crystalline magna is withdrawn from crystallizers 243 by valved conduits 244; e.g. 244a, 244b or 244c, and charged tangentially to liquid cyclone 245 from which underflow stream 246 contains an aqueous slurry of 95 percent IPA (5 percent TPA) from which that IPA product can be separated by filtration. OVerflow stream 247 from liquid cyclone 245 contains TPA product consisting of 60 percent TA and 40 percent IPA which is recycled to displacer 32 as part of its water supply.

The slurry of crystalline magma from crystallizers 243 can be charged to a filter, the recovered solid product dried and the dried product screened to separate large IPA crystal product from small TPA crystal product. The dried crystalline magma can be added to a fluid having a density between the density of the heavy large crystals and the light small crystals to permit the small floating crystals to be removed and the heavy crystals which sink to be separately removed.

EXAMPLE 2

A mixture of equal weight parts of o-xylene and p-xylene are oxidized in reactor 10 modified by eliminating reflux condenser 18 and condenser 20 and in their place providing a horizontal condenser attached to vapor line 17, a condensate receiver, a short packed distillation column to receive condensate and a liquid phase separator. Exhaust from line 17 pass into the horizontal condenser and uncondensibles are vented through scrubber 23 as before. Benzene is added to the acetic acid-water condensate flowing from condensate receiver to the distillation column in an amount to form an azeotropic mixture with water vaporized from the feed. The benzene-water vapor mixture from the still is condensed, the condensate flows to the liquid phase separator from which the upper aqueous phase is withdrawn and enters line 21. The lower benzene phase is recycled for mixing with the acetic acid-water condensate. The bottoms from the still, substantially only acetic acid, is returned to reactor 10.

The oxidation is conducted continuously at 190° C. and 28 atmospheres pressure using on an hourly basis 1.0 pound mole of the mixed xylene, 212 pounds 97 percent acetic acid (3 percent water) containing catalyst components in the concentrations and air rate described in Example 1. Liquid oxidation effluent from reactor 10 comprises the 97 percent acetic acid and dissolved catalyst components, 73 pounds dissolved o-phthalic acid and 73 pounds TPA of which 4–5 percent is dissolved. The water phase from azeotropic distillation (36 pounds per hour cooled to 13° C.) is added to the effluent via valved line 21a to cool the effluent to 158° C. and depressured to 3.95 atmospheres. No scrubber liquor is added to the effluent but rather is discarded because of its low acetic acid content. All the o-phthalic acid remains dissolved in the cooled and diluted effluent mother liquor (83 percent acetic acid and 17 percent water) and about 1 percent TPA remains dissolved. The cooled and diluted effluent without concentrating in concentrator 28 is charged to displacer 32 having a column of water at 3.95 atmospheres filling 85 percent of its volume. With no upflow of water 72 pounds per hour of TA drops down through the column of water and is removed with 240 pounds of water at 20° C. introduced into displacer 32 via water charge line 33. This slurry of TPA can be separated by filtration for dimethyl terephthalate manufacture.

The displaced acetic acid (83 percent acetic acid and 17 percent water) solution of o-phthalic acid is removed from displacer 32 as overflow by line 34, is stripped of water and acetic acid in stripper 45, whose bottoms flow to evaporator 51 where crude PAN vapors evolve and are conducted away by PAN vapor line 53. An 80 percent yield of PAN is obtained (80 percent of crude PAN vapors) from PAN fraction via line 75 from fractionator 66.

EXAMPLE 3

The oxidation step of Example 1 is repeated using as xylene feed a mixture of m-, p- and o-xylenes in the weight ratio of 2:1:1 and a 2:1 acetic acid to xylene solvent ratio. The liquid oxidation effluent contains on an hourly basis 212 acetic acid having dissolved therein catalyst components, 39 pounds o-phthalic acid (OPA) and most of the 78 pounds of IPA but little of the 39 pounds of TPA. The liquid effluent is diluted with 50 pounds total of condensate from valved line 21a and scrubber liquor from valved line 31a which cools the diluted effluent from 225° to 164° C. Further cooling of the diluted effluent by indirect heat exchange (not shown) to 85° C. and 1.0 atmosphere keep all the OPA in solution with 3 percent IPA (75.6 pounds IPA undissolved).

Displacer 32 can in this process be operated at 1.0 atmosphere pressure with water at 90° C. and no net upflow of water. As the 85° C. diluted liquid effluent contacts the column of water (90 percent of height of displacer 32) the 39 pounds of undissolved TPA and 75.6 pounds of IPA drop through the column of water and are removed with 510 pounds of water introduced into displacer 32 via line 33. The overflow from displacer 32 comprises the 262 pounds acetic acid (82 percent acetic acid and 18 percent water) with 39 pounds dissolved OPA and 2.4 pounds dissolved IPA. This is processed as in Example 1 to recover PAN. The IPA is part of the residue from evaporator 51.

The slurry of 75.6 pounds of IPA and 39 pounds of TPA in 510 pounds of water removed from displacer 32 via line 35 and pump 36 and charged via line 37 to dissolver 40 is heated therein to 190° C. and 33 atmospheres pressure thereby dissolving the 75.6 pounds of IPA and 8.4 pounds TPA on an hourly basis leaving 31.5 pounds TPA undissolved. This solution of constant ratio solute (IPA–TPA) composition containing 31.5 pounds undissolved TPA (hourly basis) is processed as described in Example 1. The wet TPA product from solid-liquid separator 225 (shown as filter in FIG. 2) via product discharge 226 contains 31.5 pounds (dry basis) TPA. A IPA product (95–96 percent IPA on dry basis) is discharged via underflow line 247 and amounts to about 90 percent of the IPA in the constant ratio solute composition about 72 pounds per hour total of which 68 pounds is IPA.

The present inventive integrated process can be conducted starting with the continuous operation of the liquid phase air oxidations employing an aldehyde or methylenic ketone side-chain oxidation initiator or promoter which generally employ lower oxidation temperatures, for example 100° to 150° C. It will be apparent to those skilled in this art that the displacement step subsequent to oxidation need only be adjusted with respect to temperature and pressure taking into account those lower oxidation temperatures and lower accompanying pressures. The step of this integrated process which affords cooperation between the prior and subsequent procedural step is the displacement step.

What is claimed is:

1. An integrated continuous process for conversion of a mixture of isomeric xylenes to individual phthalic acid isomer products which comprises:
   a. continuous air oxidation of a mixture of isomeric xylenes containing at least one of m-xylene or p-xylene in the presence of catalysis provided by a heavy metal oxidation catalyst and a side-chain oxidation initiator or promoter and in the presence of acetic acid reaction medium in an oxidation zone in which liquid phase conditions are maintained at a temperature in the range of 100°–275° C.;
   b. continuous removal of liquid oxidation effluent from the oxidation zone;
   c. continuous contact of the liquid oxidation effluent with liquid water in a displacement zone into which liquid water is introduced in an amount to maintain liquid water to displace acetic acid portion of said effluent as an overflow from the displacement zone and a slurry of at least one of crystalline isophthalic acid or terephthalic acid as a bottoms stream from said displacement zone;
   d. recovering at least acetic acid from the displaced acetic acid portion of the oxidation effluent; and
   e. recovering at least one of isophthalic acid or terephthalic acid from said displacement zone bottoms stream as a product of at least 95 percent isophthalic acid or terephthalic acid content.

2. The process of claim 1 wherein there is in said displacement zone a column of liquid water of 0–50 percent upflow based on acetic acid content of said oxidation effluent, the slurry comprising the bottoms stream from said displacement zone contains both isophthalic acid and terephthalic acid in the ratio of at least one part of terephthalic acid for nine parts isophthalic acid on a weight basis; and a product of at least 95 percent isophthalic acid content is recovered by dissolving substantially all the isophthalic acid in water, separating the solution from undissolved terephthalic acid, cooling the separated solution slowly first to its cloud point and rapidly thereafter and produce a crystalline magma consisting of large isophthalic acid product crystals and small terephthalic acid product crystals, and separating those product crystals on the basis of product density classification.

3. The process of claim 2 wherein a portion of acetic acid is removed from the liquid oxidation effluent and its concentrate is charged to the displacement zone for contact with the column of liquid water.

4. The process of claim 3 wherein the mixture of xylenes oxidized consists of a mixture of m-xylene and p-xylene.

5. The process of claim 3 wherein the solution containing dissolved isophthalic acid is treated with activated carbon or a noble metal on high surface area active carbon prior to recovering the isophthalic acid product by the crystallization providing different size crystals separated by density classification.

6. The process of claim 3 wherein the mixture of xylenes oxidized consists of m-xylene, o-xylene and p-xylene in the respective weight ratio of 2:1:1.

7. The process of claim 3 wherein the mixture of xylenes oxidized consists of o-xylene and p-xylene and terephthalic acid is recovered from the displacement zone bottoms stream by solids-liquid separation.

* * * * *